United States Patent [19]
Sutherland et al.
[11] 3,816,726
[45] June 11, 1974

[54] COMPUTER GRAPHICS CLIPPING SYSTEM FOR POLYGONS

[75] Inventors: Ivan E. Sutherland; Gary W. Hodgman, both of Salt Lake City, Utah

[73] Assignee: Evans & Sutherland Computer Corp., Salt Lake City, Utah

[22] Filed: Oct. 16, 1972

[21] Appl. No.: 298,084

[52] U.S. Cl. .................. 235/152, 235/151
[51] Int. Cl. .................. G06f 7/38, G06f 15/20
[58] Field of Search ......... 235/151, 152; 340/324.1, 340/172.5; 33/1 K; 444/1

[56] References Cited

UNITED STATES PATENTS 3,602,702 8/1971 Warnack .................. 235/151
3,639,736 2/1972 Sutherland .................. 235/152

OTHER PUBLICATIONS

A. Appel, "The Notion of Quantitive Visibility & Machine Rendering of Solids" Proceeding ACM, 1967, pp. 387–393.

*Primary Examiner*—Malcolm A. Morrison
*Assistant Examiner*—David H. Malzahn
*Attorney, Agent, or Firm*—Nilsson, Robbins & Berliner

[57] ABSTRACT

A system is disclosed for clipping three-dimensional polygons for use in a computer-graphics display. The system removes from each polygon all parts that lie outside an arbitrary, plane-faced, convex polyhedron, e.g. a truncated pyramid defining a viewing volume. The polygon is defined by data representing a group of vertices and is clipped separately in its entirety against each clipping plane (of the polyhedron). In a multiple-stage structure as disclosed, each stage clips the polygon against a single plane and requires storage for only two vertex values. A time-sharing embodiment of the system is also disclosed. The disclosed system also incorporates the use of a perspective transformation matrix which provides for arbitrary field-of-view angles and depth-of-field distances while utilizing simple, fixed clipping planes.

19 Claims, 11 Drawing Figures

COMPUTER GRAPHICS CLIPPING SYSTEM FOR POLYGONS

BACKGROUND AND SUMMARY OF THE INVENTION

In general, the present invention relates to the computer processing of three-dimensional data to produce realistic two-dimensional pictures. A considerable amount of development work has been done in the field, and a variety of different approaches have been taken to process the data. One problem that is usually somewhat inherent in the operation relates to selecting the portion of a data-defined image that will lie within the field of vision. The process of selecting the desired portion of an image component has generally been termed polygon clipping. That is, polygon clipping is a process whereby a polygonal surface extending beyond the boundary of some three-dimensional viewing volume is reduced to a surface which does not extend beyond the boundary. Essentially, as indicated above, the process involves "clipping off" those parts of the polygon which lie outside a volume defining the field of view, to eliminate off-screen portions of objects from the actual developed image.

One technique of polygon clipping which has been employed in the past involves a simple extension of line clipping. That is, in accordance with a prior system, a polygon is considered to be closed by a number of edges, each of which is clipped as a line, against all the clipping boundaries. Unfortunately, that approach involves complications in determining locations for added edges along a boundary. For example, if a given polygon surrounds a corner of a viewing area, then two new edges must be developed which share a vertex at the corner of the viewing area. It is difficult and complex to compute whether a polygon surrounds a corner of a viewing area, and in fact if the polygon is not planar, there may be no clearly defined answer.

Considering another situation suppose the presence of a large area that is to be displayed. Further suppose that the area is so large that all its edges lie outside the field of view. For example, the area might be a triangle with all its vertices well outside the field of view. As the area or surface presented by the triangle passes completely across the field of view, the clipping system should produce a quadrilateral output that corresponds to the entire viewing area. That is, each corner of the output quadrilater should lie at a corner of the viewing screen. For example, if the triangle were yellow, the entire screen would be filled with yellow color unless some object nearer to the observer obscured a part of the yellow triangle. The clipping process to define the desired quadrilateral from the large triangle has been considered exceedingly difficult and complex with regard to computer graphics.

Accordingly, a need exists for a polygon clipping method that may be embodied in a relatively simple structure and which may be more easily utilized to accomplish clipping operations as in relation to computer graphics.

In distinction of the conventional system of clipping, the present system abandons the notion of defining a polygon in terms of its edges and rather considers the polygon to be defined solely by its vertices. Accordingly, each vertex may be processed somewhat independently of other vertices with a view toward closing the polygon on processing the last vertex. The system hereof also abandons the notion of clipping each separate edge against all clipping boundaries simultaneously in favor of clipping the entire polygon intact, against each clipping boundary in sequence. Consequently, it is not necessary to reassemble a polygon from a collection of disjoint, clipped edges. Such a change in fundamental approach results in dramatic simplification of the polygon clipping process. Furthermore, the simplification is achieved without increased requirements for computing capability or storage. In the operation of a system embodying the invention, the preliminary results from one stage of clipping may be used by subsequent stages without waiting for (nor storing) the entire polygon between stages.

BRIEF DESCRIPTION OF THE DRAWINGS

In the drawings, which constitute a part of this specification, exemplary embodiments exhibiting various objectives and features hereof are set forth, specifically.

Figure 3:
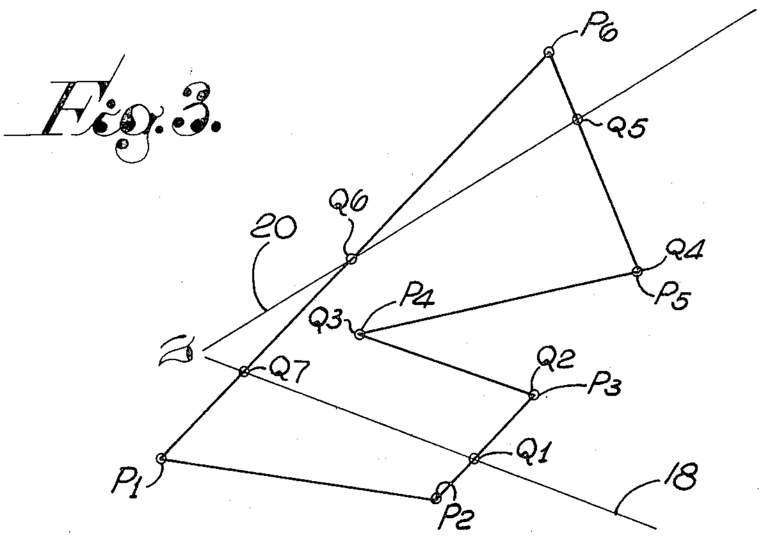
Figure 4:
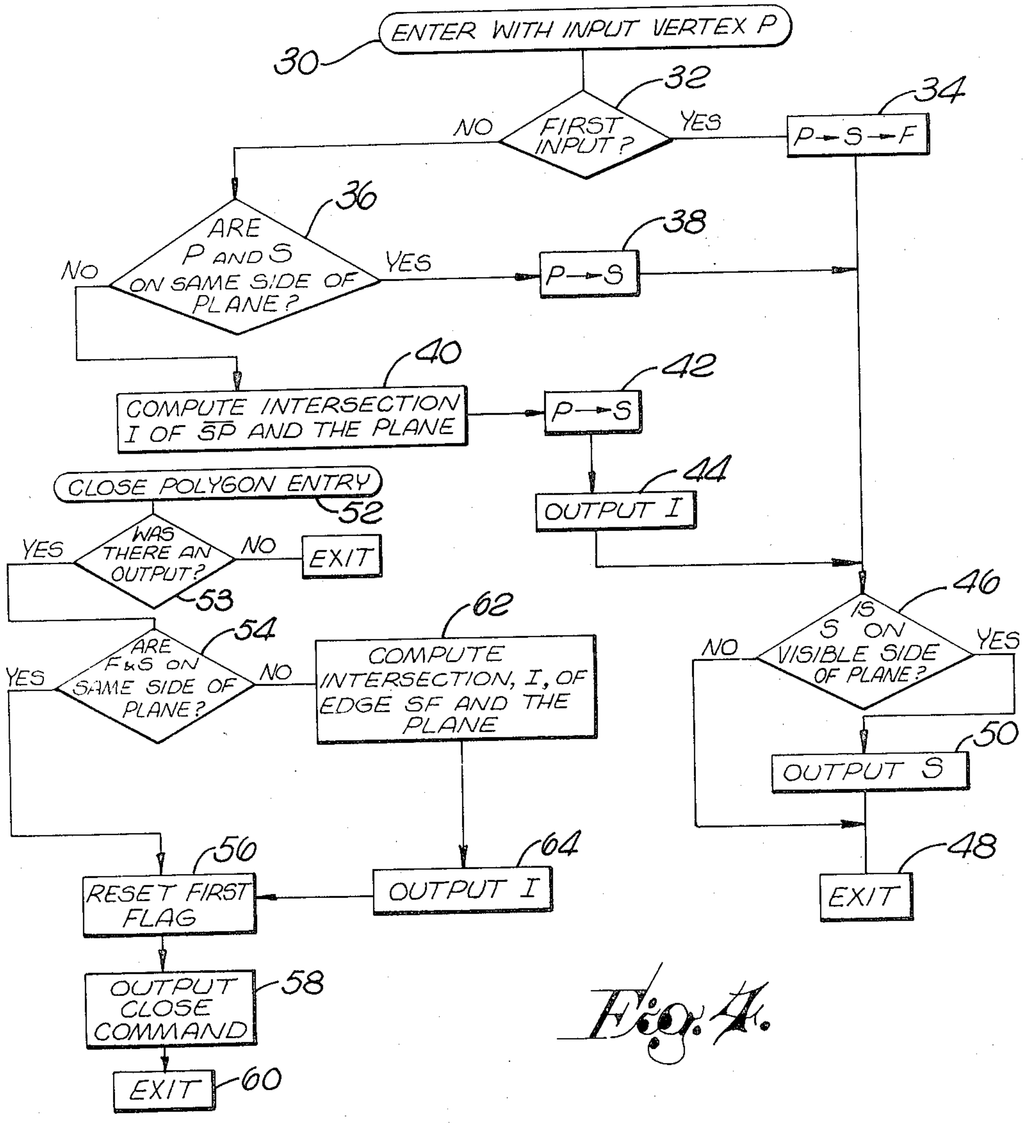
Figure 5:
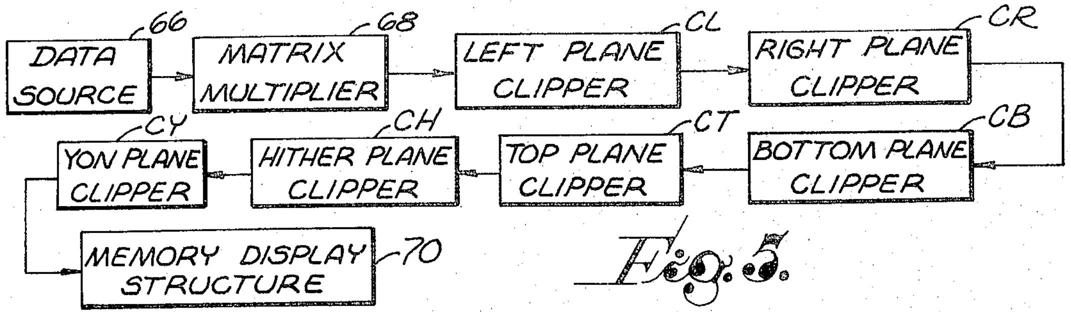
Figure 6:
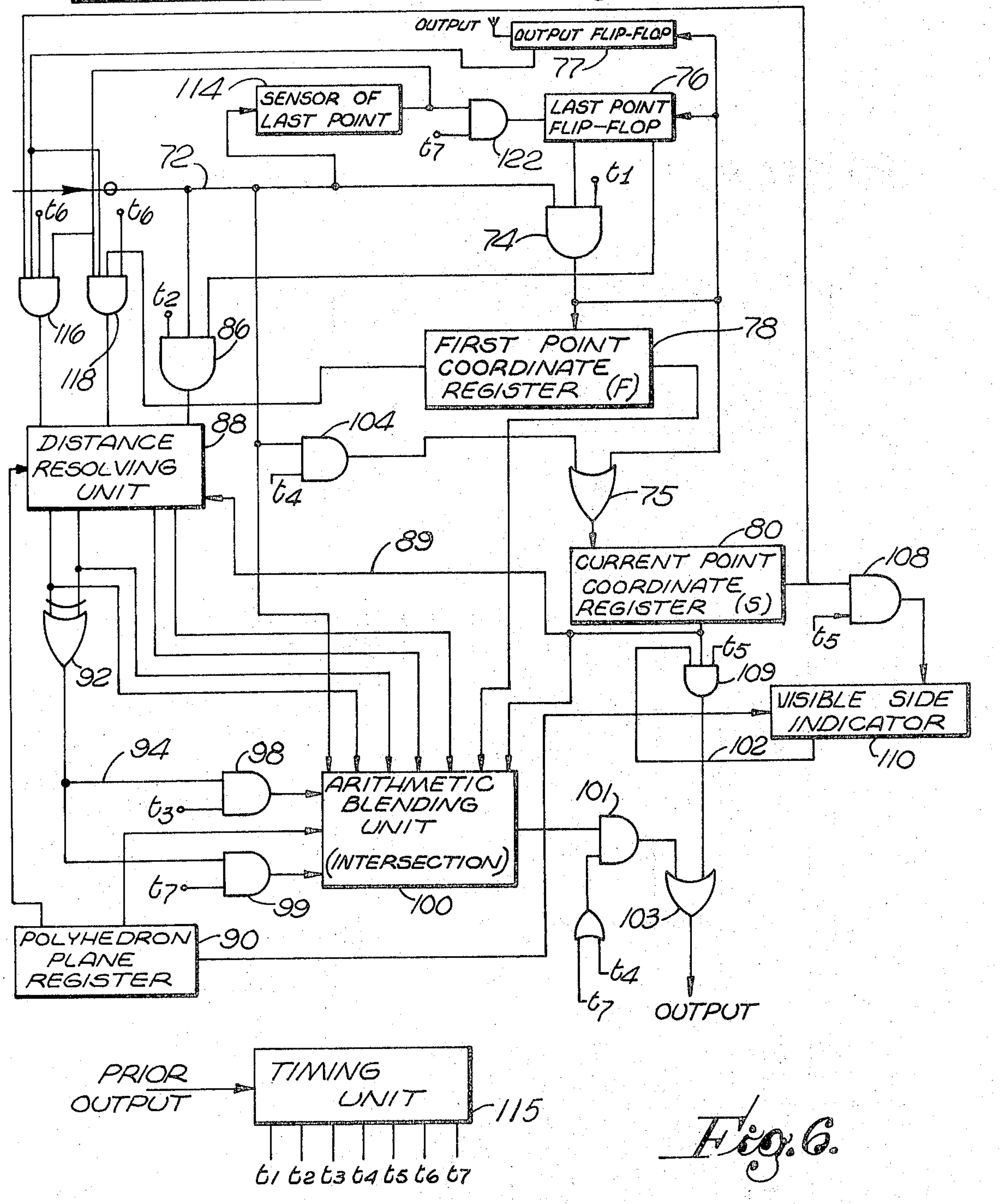
Figures 7, 8:
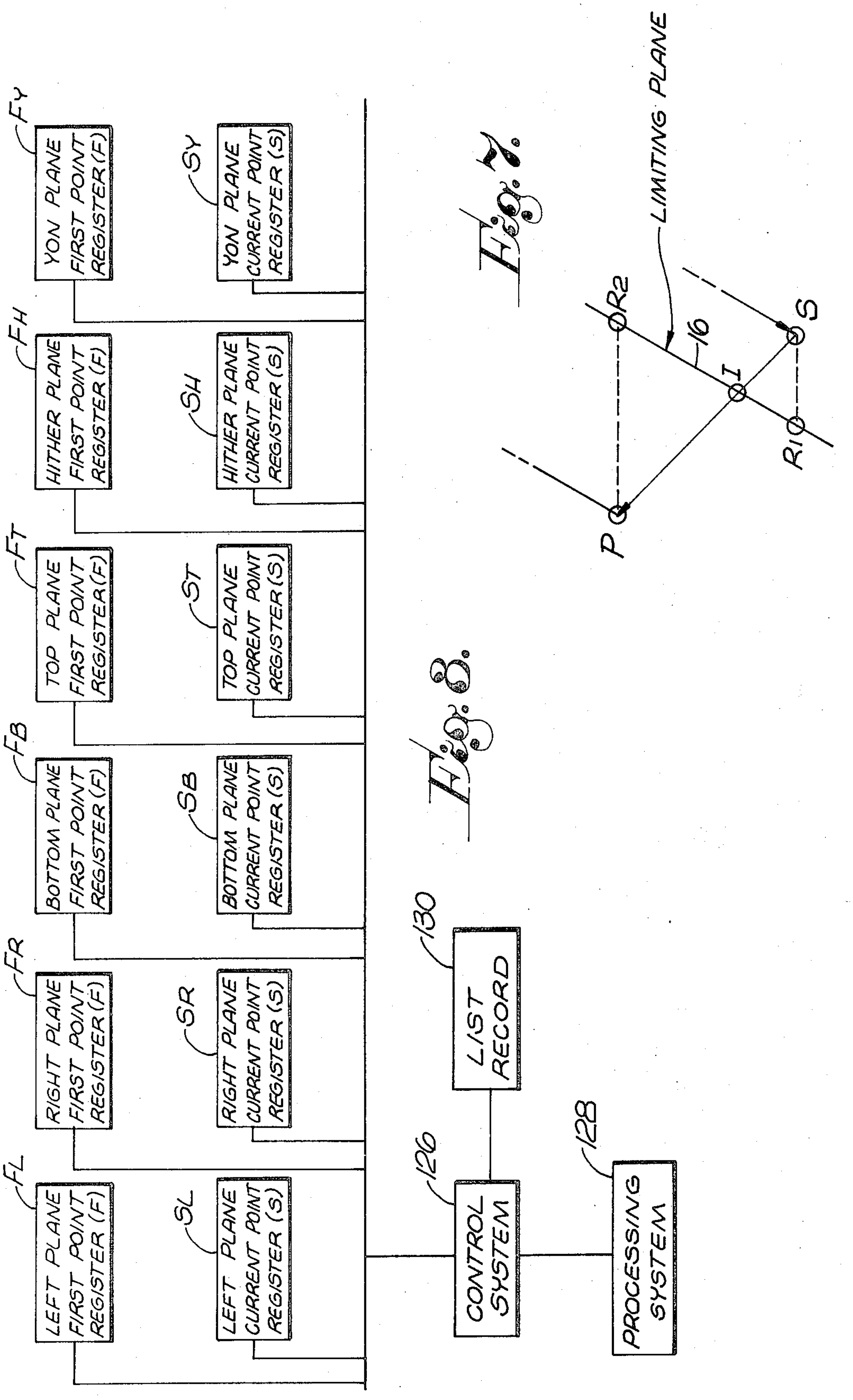

FIGS. **2*a*–2*d*** are graphic representations illustrative of certain operational phases of a system according to the present invention;

FIG. 3 is another graphic representation illustrative of operations by a system in accordance with the present invention;

FIG. 4 is a flow diagram representative of the process of the present invention;

FIG. 5 is a block diagram representative of one embodiment of the present invention;

FIG. 6 is a block and logic diagram illustrative of a component of the system of FIG. 5;

FIG. 7 is a graphic presentation illustrative of the operation of a component in the structure of FIG. 6; and FIG. 8 is a block diagram representative of an alternative embodiment of the present invention.

DESCRIPTION OF THE ILLUSTRATIVE EMBODIMENTS

As required, detailed illustrative embodiments of the invention are disclosed herein. The embodiments merely exemplify the invention which may, of course, be constructed in various other forms, some of which may be quite different from the disclosed illustrative embodiments. However, specific structural and functional details disclosed herein are merely representative and in that regard provide a basis for the claims herein which define the scope of the invention.

The perspective projection process is truly a transformation from one three-dimensional space to another. A camera transforms the three-dimensional scene being photographed into a three-dimensional image located near the film plane. The fact that cameras must be focused is evidence of the three-dimensional nature of the image. That is, the film must be moved within the image volume until its position corresponds with the position of the portion of the scene or image being recorded. Similarly, depth information can be preserved through mathematical perspective transformation.

In dealing merely with points of an image, perspective depth transformations may be accomplished rather simply; however, in dealing with straight lines and planes as well as curved surfaces, the problem becomes more complex. In fact, only a single transformation and certain trivial scalings of the transformation exist. The existence of a fully three-dimensional perspective transformation is crucial to the presentation of hidden-surface images. The existence of the transformation enables a collection of objects to be viewed in perspective which is exactly equivalent to a similar but transformed collection of objects viewed in parallel projection. That is, the X and Y coordinates of an object can be transformed into actual final positions on a screen while preserving the depth in the numbers which will correctly interpolate along straight lines across planes defined in the screen coordinate space. Accordingly, independent data defining a plurality of individual polygons representative of objects in a scene may be compiled and composed for presentation as a perspective image. For example, by resolving a physical structure, e.g. a vehicle, into a plurality of polygons and specifying the polygons mathematically, the data can be manipulated and translated to view the object from various locations and in various positions.

Because the perspective depth computation involves the mathematical process of division, there is always a possibility of an overflow. Additionally, a line which connects a point in front of an observer with a point behind him would transform into a very strange line if its ends are simply transformed by the perspective transformation. For these and other reasons, it is important to limit the permissible values of coordinate components X, Y, Z and W prior to doing division. It is noteworthy that in accordance herewith, the three-dimensional data may be represented by homogeneous coordinates (e.g. each point is specified in terms of X, Y, Z and W) to attain specific advantage.

In accordance with tradition, the X coordinate specifies the horizontal (left and right); the Y coordinate specifies the vertical (top and bottom). In accordance herewith, clipping is also performed in the depth plane, represented by the Z coordinate (hither and yon). A W coordinate also may be employed as described herein and attains the homogeneous characteristic. For example, the W coordinate enables transformations as explained below which essentially vary the polygonal viewing field, e.g. truncated pyramid.

Systems in accordance herewith will generally afford improvement by limiting the values of X, Y, Z after perspective division. For example, it is generally convenient to confine values of X and Y to a specified range between −1 and +1, to accomplish simplified scaling operations in the coordinate system. It is also convenient to provide values of Z in a range of 0 to 1, again for simplified scaling. Accordingly, it is normally advisable to clip on limits which establish the X and Y values between −W and +W, and Z values between 0 and +W.

Figure 1:
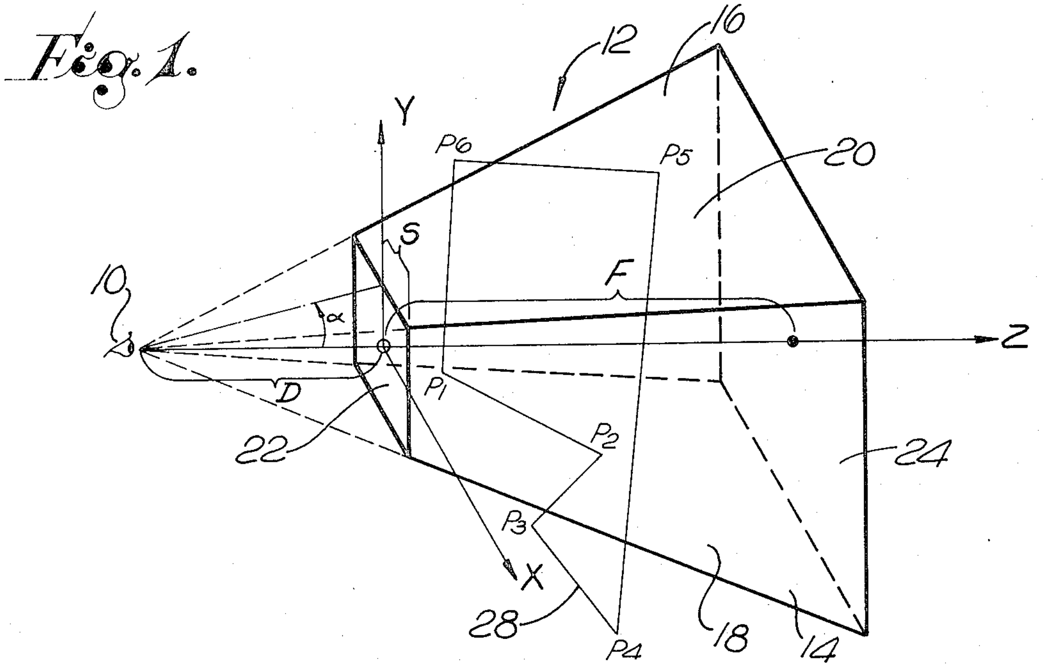
FIG. 1 is a graphic representation illustrative of certain aspects of a system according to the present invention.

These clipping limits correspond to six planes termed, as suggested above, "left," "right," "bottom," "top," "hither," and "yon." Generally, these planes define a truncated pyramid as depicted in FIG. 1. Specifically, considering an observation point, represented by an eye 10, at the apex of a pyramidal polyhedron 12, the objects to be displayed (defined by polygons) are confined to the volume of the polyhedron. Consequently, in accordance herewith, such polygons are clipped in relation to right plane 14, a left plane 16, a bottom plane 18, a top plane 20, a hither plane 22 and a yon plane 24.

The limited transformation, as mentioned above, attains perspective results in clipping to a truncated pyramidal polyhedron with a 90° field-of-view. Generally, a 90° field-of-view is exceedingly broad with the consequence that pyramidal forms of smaller angles are frequently to be preferred. In fact, in accordance herewith, the present system enables clipping to any field of view, as well as the placement of the hither and yon planes 22 and 24 as desired. The transformation is accomplished by a matrix multiplication applied to the raw data prior to the clipping operations as described in detail below. Specifically, referring to FIG. 1, the matrix involves the distances D, S and F as follows:

$$M=\begin{bmatrix}1 & 0 & 0 & 0\\ 0 & 1 & 0 & 0\\ 0 & 0 & \frac{S}{F}+\frac{S}{D} & \frac{S}{D}\\ 0 & 0 & 0 & S\end{bmatrix}=\begin{bmatrix}1 & 0 & 0 & 0\\ 0 & 1 & 0 & 0\\ 0 & 0 & \frac{S}{F}+\tan\alpha & \tan\alpha\\ 0 & 0 & 0 & S\end{bmatrix}$$

The transformation places the clipping planes at any desired locations. In fact, the distance D can be made infinite as can the position of the yon plane 24 without causing any anomalous behavior of the transformation matrix. It is convenient that the transformation matrix can obtain all information for an arbitrary, truncated pyramid, because the clipping process can then be standardized to very simple limits in accordance with the system as set forth in detail below.

Pursuing a specific example, a polygon 28 (FIG. 1) of irregular shape is indicated, a portion of which is deemed to reside within the polyhedron 12 while other portions are external. Generally, the polygon 28 is defined by vertices P1, P2, P3, P4, P5, and P6. In accordance herewith, the system functions to consider a polygon (as the polygon 28) eliminating those portions which lie outside the polyhedron 12 to redefine a polygon for presentation. In instances when a portion of the polygon extends out of the polyhedron, e.g. the portion between vertices P3 and P4, it is necessary to define an edge of the polygon coinciding to the clipping plane. Generally, in accordance with the operation of the present system, such edges are defined to close the redefined polygon.

One of the basic components of the present system functions to clip the polygon against a limiting plane, e.g. one of the planes of the polyhedron 12, and in that manner the vertices are treated one at a time. For each vertex considered, zero, one or two new vertices will be generated, depending upon the position of the input vertices with respect to the limiting plane. Each input vertex (excepting the first) is considered to be a terminal vertex of an edge, namely the edge defined by an input vertex value herein termed P, and the position of the just previous input vertex saved internally in a register and termed the saved vertex S. The system produces vertices defining the clipped polygon depending upon the relationship between the input vertex P and the saved vertex S as these points relate to the limiting plane.

Pursuing the basic clipping operation, there are four possible relationships between the edge and the limiting plane. The edge may be entirely on the visible side of the limiting plane, e.g. the edge between vertices P1 and P2 (FIG. 1) is above bottom plane 18. Also, the edge may be entirely outside the polyhedron, e.g. the edge between vertices P3 and P4. Another possibility is that the edge leaves the visible side of a plane, e.g. the edge between vertices P2 and P3. Finally, the edge may enter the visible side of a limiting plane, e.g. the edge defined between the vertices P4 and P5. These four possible cases are illustrated in FIG. 2 and now will be considered in somewhat greater detail.

Each of the FIGS. 2*a*, 2*b*, 2*c* and 2*d* indicates a visible plane 15 so that portions of a polygon existing on the visible side of the plane 15 (as viewed from the edge) are to be preserved for display while portions thereof lying on the non-visible side of the plane 15 are to be clipped, and accordingly eliminated. To illustrate the possible situations, a polygonal edge is defined in each case by vertices S and P, i.e., saved and input vertices. As indicated above the vertex P is the currently presented point and the vertex S is the saved, last vertex P in the progression.

Figure 2A:
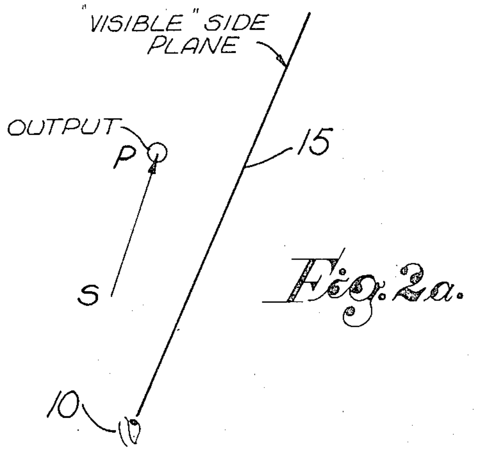

Considering the initial case represented in FIG. 2a, the edge defined by the vertices S and P lies entirely on the visible side of plane 15. Accordingly, no clipping operation is performed; rather the vertices S and P continue to exist definitive of an edge in the polygon which will actually be presented. The vertex P becomes the new vertex S (for the next test) and is also provided as an output.

Figure 2B:
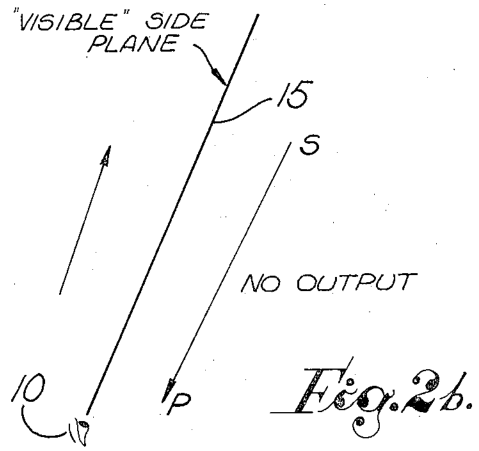

The situation as depicted in FIG. 2b involves an edge defined between vertices S and P, which lies entirely outside the field-of-vision, i.e., right of the plane 15. As a consequence, the vertex S was dismissed in a prior test and the vertex P is now dropped, as neither is to be preserved for the display image being formulated. The vertex P becomes the new vertex S (saved) and no output is provided.

Figure 2C:
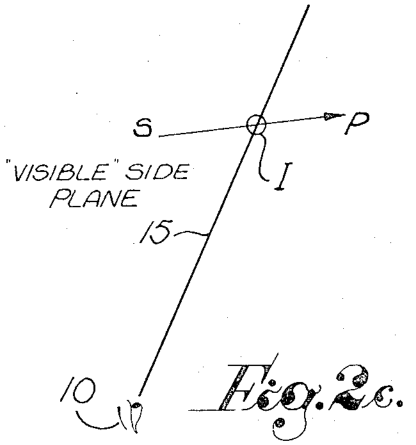

In the situation depicted in FIG. 2*c*, the edge of the polygon under consideration extends from within the field-of-vision to without, as indicated between the vertices S and P. Consequently, the portion to the left of the plane 15 is to be preserved while the portion to the right is to be clipped. Consequently, the vertex S (a valid point preserved in a prior operation) initiates a vector that terminates, not at the vertex P, but at the intersection point I. Accordingly, the point I is provided as an output. Vertex P will as always become a fresh value of the saved vertex S.

Figure 2D:
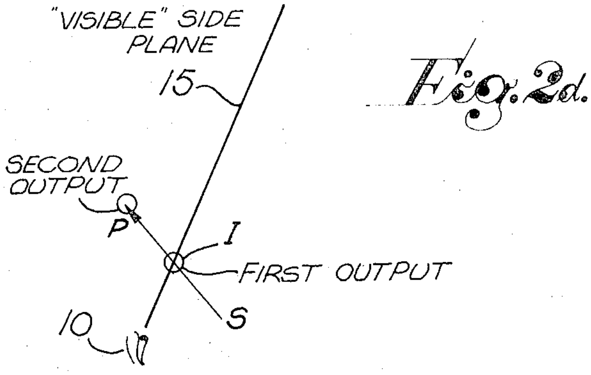

In the situation depicted in FIG. 2*d*, the polygonal edge moves from the vertex S located outside the field-of-vision, to the point P located in the field-of-vision. As a consequence, two outputs are to be provided in the form of the intersection I and the vertex P. That is, to define the clipped edge (between I and P) both points are provided as outputs and P becomes the fresh value of vertex S.

It may be seen that by treating a polygon with respect to each of the clipping planes as described above, a new polygon may be developed that is definitive of a fragment of the original polygon which is actually to be exhibited or displayed. Consider a rather-complex polygon defined by the vertices P1–P6 (FIG. 3) with reference to a bottom edge-viewed plane 18 and a top edge-viewed plane 20. In summary, the operation involves defining another polygon (by the vertices Q1–Q7) manifesting the portion of the original polygon which is to be exhibited within the pyramidal polyhedron. As indicated above, the clipping operation is accomplished with reference to each of the limiting planes which define the polyhedron.

As illustrated in FIG. 3, the initial vertex P1 lies below the limiting plane 18 with the consequence that it is to be eliminated. Accordingly, data definitive of the vertex P1 is not registered. Next, the vertex P2 is encountered, and a similar situation exists. That is, as the vertex lies below the limiting plane 18, the definitive data is of no interest. In moving from the vertex P2 to the vertex P3, the limiting plane 18 is penetrated. Consequently, at the point of intersection a vertex Q1 is developed which becomes the initial or first vertex of the clipped polygon. As indicated above, with reference to FIG. 2d, this situation must result in two recorded or output data units definitive of the vertices Q1 and Q2.

Progressing from the point or vertex P3 to the vertex P4, the situation of FIG. 2*a* occurs which commands a single output definitive of the vertex Q3. Progressing from each of the vertices P4, P5 and so on, it may be seen that one of the situations depicted in FIG. 2 exists and the resulting outputs are provided. These outputs may immediately command a display or, alternatively as suggested above, may be recorded for a subsequent display operation. Although illustrated against two clipping planes only in FIG. 3, the operation of the system as described in detail below involves six planes and the progression of output vertices for testing against one plane after another.

Some special care must be taken at the beginning and end of each polygon processed. For example, the system might be given N + 1 input vertices to define a polygon, the last vertex being a duplicate of the first so as to generate M output vertices Q*l*–Q*m*. If this were done, symmetry would require that the system include a mechanism to produce the duplicate output vertex Q*m* + 1. The system disclosed here, unlike previous embodiments, never needs to be given the duplicate N + 1'st input nor does it generate the duplicate output Q*m* + 1. Of course, alternative embodiments may be provided; however, as embodied herein, the additional mechanism to eliminate need for such duplicate vertices simply amounts to an internal storage register (generally termed F) for containing the first arriving vertex and enabling closure thereto for the final edge.

Considering the process for implementing the operations as described above, reference will now be made to the flow diagram of FIG. 4. Generally, the diagram represents the clipping operation as applied to a single plane. Recapitulating, the process simply involves accepting data representative of a vertex P, performing logical conclusions with respect to the data representative of the vertex P in relation to a prior vertex S, and producing appropriate outputs.

As indicated in FIG. 4, the initial step involves registering or accepting the data indicative of the vertex P as represented by the block 30. The information or data provided is next considered in a decisional stage indicated by the block 32 to determine whether or not the represented vertex P is a first point. Of course, the first point can be flagged or, alternatively, as disclosed in the structure embodied below, the last point can be flagged to simply indicate that the next-following point is a first point.

If the data representative of the vertex P is representative of a first point, the data is registered in an S register (for the vertex S) and an F register (for the first point F). On completion of the registration process as indicated by the block 34, an intermediate stage is attained.

Should the data representative of the vertex P not be indicative of the first point, the process proceeds from the test stage (indicated by the block 32) to another decisional stage indicated by a block 36. Specifically, the logical test is directed to the query: Are the vertices P and S on the same side of a clipping plane Should the query step result in a positive determination, the data representative of the vertex P is registered as the value S and again an intermediate stage is completed. However, if a negative result should occur, the process proceeds to compute the intersection I of the vector defined by the vertices S and P with the clipping plane, as indicated by the block 40. The intersection I is represented by developed data indicative of that point which becomes a vertex. Upon completing the computation, by any of a variety of techniques, examples of which are disclosed below, the data representative of the vertex P is transferred to become data representative of the vertex S as indicated by the box 42. Subsequently, the vertex I is provided as an output as indicated by the box 44 and the intermediate stage is again attained.

From the intermediate stage, the process enters a step as indicated by a box 46, which queries whether or not the data representative of the fresh vertex S defines a vertex on the visible side of the plane. If the determination is in the negative, the process immediately passes to an "exit" as indicated by the block 48. However, if an affirmative determination results, then the value of the fresh vertex S is provided as an output as indicated by the block 50.

The process operates with a current input vertex P, a registered or saved-last vertex S and a registered first vertex F. The registered vertex F is registered for purposes of closure. Otherwise, the process involves determining whether or not the vertices P and S are on the same side of a clipping plane (block 36) and if so, whether or not that side is the visible side (block 46). Alternatively, the process pursues the computation to determine an intersection in the path between the vertices S and P thereby defining a new vertex at the intersection I with the clipping plane, as indicated by the block 40. Thus, as indicated above, each entry of data representative of a fresh vertex P may result in either: (1) no output data representative of a vertex; (2) output data representative of a single vertex; or (3) output data representative of two vertices.

As indicated above, in accordance with one embodiment of the process, an instruction is provided after processing the last vertex to close the polygon. The closing process is initiated at the step of a box 52 as indicated. Of course, as a condition to closing a polygon, some portion of the polygon must be determined to lie within the field of vision. That is, at least one point must have been provided as an output to indicate a location within the field of vision. Accordingly, a query indicated by a box 53 is: was there an output. If not, then there is nothing to close. If so, the process proceeds to determine whether or not the vertices F and S are on the same side of the clipping plane as indicated by the block 54. An affirmative response to the query step simply involves resetting a flag as indicated by the block 56 and providing an output to the closure command as indicated by the block 58 which in turn results in an "exit" as indicated by the block 60. Alternatively, if the query step results in a negative, an intersection must again be computed to define a vertex I at the clipping plane as indicated by the block 62. Subsequently, the vertex I is provided as an output as indicated by the block 64. Then, the process proceeds to the operation of the block 56. Thus, the system closes to define the clipped polygon.

Considering the process illustrated in FIG. 4 in operation, reference will be made to FIG. 3. In that regard, an un-clipped polygon is defined by a plurality of vertices P1–P6; while the clipped polygon that is to be generated is defined by the vertices Q1–Q7. Relating the graphic presentation of FIG. 3 to the process flow diagram of FIG. 4, an initial step involves presenting the vertex P1 as a vertex P to the process step as represented by the block 30. The vertex P1 is in fact the first point, and, accordingly, will be registered as values of S and F as indicated by the block 34. However, the step represented by the block 46 determines that the value so registered as a vertex S is not on the visible side of the clipping plane 18 with the consequence that the process is indicated to be complete with regard to the vertex P1. Next, the vertex P2 is entered and determined to be on the same side as the vertex P1 (now registered as vertex S) with the consequence that P2 is registered as the vertex S, as indicated by the block 38. On the step of testing thereafter, S is determined to be below the limiting plane 18 with the result that no output is produced.

Next, data representative of the vertex P3 is supplied for application to the step indicated by the block 36 which indicates that P3 (now P) and P2 (now S) are not on the same side of the clipping plane 18. As a consequence, the step represented by the block 40 is performed to compute the intersection Q1 (FIG. 3) as the initial vertex of the clipped polygon. Thereafter, the value of the intersection vertex I (Q1) is provided as an output while P3 (P) is registered as the vertex S. Subsequently, the test indicated by the block 46 concludes that S (P3) is on the visible side of the plane and, accordingly, results in another output, i.e., vertex Q2 as indicated by the block 50.

Thus, the cycling system processes the points vertex-by-vertex with regard to each limiting plane to develop a finally clipped polygon. Generally, the process may be performed by a structural embodiment as illustrated in FIG. 5. Specifically, a data source 66 supplies data through a matrix multiplier 68, the output of which is applied to a series of clippers CL, CR, CB, CT, CH and CY, each of which embodies the structure for performing the process as disclosed above. Specifically, in the exemplary six-sided format, the sequence of clipping is: left, right, bottom, top, hither and yon in accordance with the order indicated in FIG. 5. The output from the final clipper CY then is applied to a structure 70 which may comprise a display unit or, alternatively, a memory for recording the data, as for subsequent display.

It is to be appreciated that clipping of polygons could be performed in accordance herewith to fit in any polyhedral space. However, the addition of the hither and yon planes is deemed to be particularly significant. That is, a system in accordance herewith is deemed to incorporate a significant advance by the inclusion of operation to clip against the hither and yon planes. Previous systems have not included such facility.

The data source 66 may take the form of any of a variety of detailed structures including simply a transfer path for electrical signals, as from a memory structure. Generally, the data will comprise digital signals representative of vertices, which in the exemplary embodiment are defined in homogeneous coordinates to attain simplified operation. Such signals are received by the matrix multiplier 68 which may take the form of a structure disclosed in a pending U.S. Pat. application, Ser. No. 219,720, filed Jan. 21, 1972, now U.S. Pat. No. 3,763,365 and entitled "Computer Graphics Matrix Multiplier." Alternatively, other forms of matrix multipliers may be employed to accomplish the matrix translation as considered in depth above.

The homogeneous-coordinate data from the matrix multiplier 68 is applied vertex-by-vertex initially to the clipper CL. When the clipper CL determines a first vertex of the clipped polygon, such a vertex is specified to the clipper CR. Again, clipping is performed vertex-by-vertex and those vertices which are developed (Q1) from each clipper are applied to the following clipper until the polygon definitive of the desired presentation is specified by a group of vertices provided from the clipper CY. Accordingly, any vertex provided from the clipper CY is known to have been clipped with regard to each of the six clipping planes and represents a vertex that is to be displayed.

The individual clippers as illustrated in FIG. 5 may be structurally similar, each including apparatus for the performance of the process as illustrated in FIG. 4. Exemplary of the clippers, the clipper CL is indicated in substantial detail in FIG. 6 and will now be explained. Generally, the lines or transfer paths indicated in FIG. 6 may comprise multi-conductor cables for parallel-information transfer or, alternatively, may involve sequential signal transfer paths, both forms being very well known in the art. Such a path receives the input vertices P1, P2, and is designated in FIG. 6 as path 72 (near top). As indicated, the data represented will be in the form of homogeneous coordinates. Specifically, each vertex is represented by digital signals to manifest:

X, Y, Z, W, C and I.

In such a representation, the specific representations are:

X is the horizontal displacement of the vertex from the viewing axis

Y is the vertical offset from the viewing axis

Z is the depth from the near plane (hither)

W is the fourth dimension value as employed in the matrix transformations

C may or may not exist and indicates a value of color

I may or may not exist and indicates a value of intensity.

With regard to the values of C and I, it may be that specific intensity or other representative levels are attributed to each point with the result that blending is developed between a pair of points to indicate a gradation in a display.

The representative data for a vertex, as considered above, is received through the path 72 for application to several separate structures which will be independently considered. First, the path 72 is connected to an "and" logic gate 74 (upper right) which may take the form of a gang gate in the event that the path 72 comprises a cable of individual conductors. The gate 74 is operative during an interval of time manifest by a signal *t1*, which constitutes the initial operating interval of the structure. Additionally, the gate 74 is connected to receive an input from a flip flop 76 which is set (explained below) by the last vertex of a polygon. Consequently, on receipt of the first vertex of a polygon, the gate 74 is qualified and supplies the received vertex signals (definitive of P) through the gate 74 to be registered in a pair of digital registers 78 and 80 (right center).

In accordance with the designations adopted above, the register 78 contains the first point and is designated F while the register 80 receives the saved vertex and is designated S. In summary, the gate 74 functions to place the first vertex (point data P) in the registers 78 and 80. Also, with the qualification of the gate 74, a reset path back to the flip flop 76 and a flip flop 77 (discussed below). Resetting the flip flop 76 inhibits the gate 74 until the last polygon is processed when the flip flop 76 is again set.

After the first vertex has been received and registered, the signals representative of data defining the second vertex (and subsequent) are not permitted to clear the gate 74 (as the flip flop 76 is reset); however, the sets of data signals are applied to an "and" logic gate 86 (center left) which may be similar to the gate 74 (as each of the other "and" gates herein, utilizing various well known structures). The gate 86 is qualified during the interval of timing signal *t2* when the flip flop 76 is reset. Accordingly, the vertex data after the initial set is supplied to a unit 88 along with signals representative of S from the register 80 via path 89.

The unit 88 is a translator or distance-resolving structure that translates the signals to a form specifying the vertices P and S, referenced to the clipping plane, i.e., left plane of the truncated pyramid, rather than in absolute coordinates. Various forms of such structures are well known. The distance-resolving unit 88 receives signals representative of the clipping plane (defining the reference ) from a register 90 (lower left) and, accordingly, simply converts distances from absolute coordinates to distances that are related to the clipping plane. The sign signals of the representations that specify the distances in relation to the clipping plane 16 (graphically illustrated in FIG. 7) are indicative of whether or not the points designated by P and S are on the same side of the plane. The representations then also may be employed to compute the intersection I of the vector between points S and P with the plane 16 as an output.

Preliminarily, the query is directed to determine whether or not points P and S are on the same side of the plane 16 (either visible or out of field). That is, if the signs of the points P and S are identical, then both are either above or below the plane 16. Accordingly, the sign bits of the signal representations for P and S are applied to an exclusive "or" gate 92 having an output to line 94 which is high if the two points are on opposite sides of the plane.

If the points S and P are on opposite sides of the clipping plane 16 (output to line 94 high), then the intersection I as indicated in FIG. 7 is to be computed. The command for such a computation is provided by a binary signal from the line 94 passing to a pair of "and" gates 98 and 99, the gate 98 being qualified by a timing signal t3. Essentially, qualification of the gate 98 commands an arithmetic blending unit 100 to compute values defining the intersection I in the plane of concern.

In that regard, the unit 100 receives signals representative of the input vertex point (P) from the path 72, as well as the contents of the register 80, i.e., vertex S. Also in addition to locating the intersection I, color and intensity blending may be performed in relation to the signals C and I if employed.

It is to be noted that various structures may be employed to compute the intersection I, one of which is disclosed in U.S. Pat. No. 3,639,736. However, it has been found convenient to employ the process with respect to a technique and structure as will now be considered. Essentially, the philosophy of operation involves ratios of the two similar triangles (FIG. 7) having apexes at the intersection I. That is, considering the similar triangles enables computation of the fraction $\alpha$ of the line between points S and P which exists before or after the line intersects the limiting plane 16. Having such a fraction computed, the intersection point is given by:

$$I = \alpha\vec{P} + (1-\alpha)\vec{S} = \vec{S} + \alpha(\vec{P}-\vec{S})$$

The value of $\alpha$ may be determined in accordance with the following:

In view of the ratio of distances specified between points:

$$\left|\frac{SR1}{PR2}\right| = \left|\frac{SI}{PI}\right|$$

then:

$$\alpha = \left|\frac{SI}{SP}\right| = \frac{|SR1|}{|SR1| + |PR2|}$$

It may be seen from the above that by establishing ratios, values are assigned which enable computation of the distances. Consequently, the value of $\alpha$ is computed simply by subtracting and dividing some simple coordinate values. The arithmetic blending unit 100 may simply apply the arithmetic set forth above to attain a value of $\alpha$ then determine the coordinates of the intersection I which are provided at output as indicated. Specifically, signals representative of the intersection I pass from the arithmetic blending unit 100 through "and" gate 101 during the interval of *t*4, then through an "or" gate 103 to the output.

Regardless of whether or not the vertices S and P are on the same side of the plane 16, and whether or not the intersection I is computed, in due course, the signals definitive of the vertex P are registered in the S register 80 (blocks 38 and 42, FIG. 4). That registration occurs during the interval of t4 through an "and" gate 104 (center) as well as the "or" gate 75.

After freshly loading the save register 80, the next operation involves determining whether or not its contents define a point on the visible side of the clipping plane. That test may be determined again by the distance-resolving unit 88 in cooperation with the exclusive "or" gate 92. However, for simplicity of explanation, redundant structure is illustrated in the system of FIG. 6. Specifically, during the interval of timing signal t5, data from the register 80 is supplied through an "and" gate 108 to a visible-side indicator 110, along with data from the plane register 90. The indicator 110 provides a high signal to the output line 102 in the event that the point defined by the contents of the save register 80 is on the visible side of the plane. Alternatively, in the opposite situation, no output is provided. If the line 102 receives a high signal during the interval of *t*5, the contents of the register 80 is passed through an "and" gate 109, then to the output through the "or" gate 103. The output is connected to provide a pulse, to initiate the operation of the next clipper. Generally, such signal is applied to a timing unit 115 in the next clipper thereby causing that unit to provide a sequence of timing signals *t*1–*t*7 as indicated in FIG. 6.

The structure as depicted in FIG. 6 is thus operative through a number of points P1, P2, P3 in sequence to perform clipping operations as explained above. Upon arrival of data specifying the last point of a polygon, providing that an output has occurred, the closing process is actuated. Specifically, the last point of a polygon bears a flag which is detected by a sensor 114 (center top) which partially qualifies a pair of "and" gates 116 and 118. These gates are fully qualified if an output flip flop 77 was set by an occurring output, whereupon the gates pass data from the registers 78 and 80 (F and S) for application to the distance-resolving unit 88 for determination of whether or not the first point (contained in the first register 78) and the saved point (contained in the save register 80) are on the same side of the clipping plane. Thus, the closure operation is similar to those described above, however, involves the first and last vertices.

During the interval of timing period *t*6, the contents of the registers 78 and 80 are applied to the distance-resolving unit 88. If the points are determined to be on opposed sides of the plane, as manifest by the exclusive "or" gate 92, the intersection is computed as previously explained by the blending unit 100 to provide signals definitive of an intersection at the output during *t*7, through the gate 101. In any event, an output close command occurs by qualification of an "and" gate 122 (top center) which sets the flip flip 76. Thus, the vertices are closed to define a clipped polygon which lies within the truncated pyramid.

As indicated above, a plurality of structures (as represented in FIG. 6) are connected together in tandem as illustrated in FIG. 5 to clip a succession of planes. The output of each clipper is passed along as the input to the next. If clipping is to be done to six planes, as disclosed in the illustrative embodiment, a total of only 12 vertex storage locations are required, i.e., six for the first vertices and six for the saved vertices. Accordingly, considerable economy and speed results.

In an alternative embodiment (FIG. 8) the limited number of registers are provided along with a control system to time share a single processing structure. In such a system, processing time is increased in he interests of manufacturing economy.

As indicated in FIG. 8, the first point registers FL, FR, FB, FT, FH and FY are connected to a control system 126 along with a series of save registers, i.e., SL, SR, SB, ST, SH and SY. The control system affords access by the registers to a processing system 128 incorporating computing apparatus substantially as disclosed with reference to FIG. 6. The control system provides access in an organized manner by means of a list record or "push-down" register 130.

In operation of the time-shared system, a single vertex is entered in the registers FL and SL to be processed against the left plane (recorded in the control system 126). If the vertex lies on the visible side of the left plane, it will be transferred as the first point for the registers FR and SR. Clipping operations are thus performed in a sequence and each time the control system advances down the registers, the interrupted stage of operation is indicated in the list record 130 so as to re-establish operation during the return pattern.

Of course, a variety of other control patterns may be incorporated in accordance herewith as may a wide variety of different structures. Consequently, the scope hereof shall be deemed to be in accordance with the claims as set forth below.

What is claimed is:

1. A clipping method for defining select data, as for a perspective display comprising the steps of:

representing data in the form of electrical signals manifesting coordinate locations;

defining a polyhedron for containing select data;

testing said electrical signals to generate those signals defining data within said polyhedron as said select data.

2. A clipping method according to claim 1 wherein said electrical signals represent vertices in three-dimensional space by four-dimensional coordinates.

3. A method according to claim 1 wherein said electrical signals represent vertex locations defining a polygon, whereby said select data defines the portion of said polygon that lies within said polyhedron.

4. A method according to claim 3 wherein said testing step includes testing said vertex locations in relation to sides of said polyhedron in sequence.

5. A clipping method according to claim 3 wherein said testing step includes a step of computing data representative of intersections between represented data and a plane of said polyhedron to thereby define other vertex locations.

6. A method according to claim 3 wherein said polyhedron comprises a pyramidal vision projection.

7. A method according to claim 6 wherein said pyramid is truncated.

8. A method according to claim 6 wherein said testing step includes testing said vertex locations sequentially in relation to each side of said pyramidal vision projection.

9. A system according to claim 6 further including a preliminary step of processing said electrical signals to produce matrix-multiplied signals whereby to translate said pyramidal vision projection.

10. A clipping method for processing data that is representative of a polygon and is manifest by electrical signals specifying vertex locations of such polygon, comprising the steps of:

defining a pyramidal field of vision by at least four defined surfaces;

testing said electrical signals representing said vertex locations in relation to said defined surfaces to identify selected vertex locations as are within said field of vision;

determining intersection locations of said polygon with said pyramidal field of vision to define a portion of said polygon within said field of vision in combination with said selected vertex locations.

11. A system for clipping a polygon comprising:

means for providing vertex electrical signals representative of vertex locations specifying said polygon;

means for registering a pyramidal projection figure including a plurality of planes;

means for receiving said electrical signals representative of vertex locations, and coupled to said means for registering, to identify certain of said vertex electrical signals as representative of vertex locations internal of said figure; and means for receiving said electrical signals representative of vertex locations, and coupled to said means for registering, to provide intersection electrical signals representative of intersections between said polygon and said figure to specify, in combination with said certain vertex electrical signals, the portion of said polygon within said figure.

12. A system according to claim 11 wherein said means for providing vertex electrical signals comprises means for providing signals representative of homogeneous coordinates to define vertices in three-dimensional space.

13. A system according to claim 12 further including a matrix multiplier for acting on said vertex electrical signals for translating said signals in relation to said pyramidal projection.

14. A system according to claim 11 wherein said means for registering a figure includes means for registering data to specify six planes definitive of a truncated pyramid.

15. A system according to claim 11 wherein said means for registering a figure includes means for registering data to specify a plurality of planes definitive of a field of vision.

16. A system according to claim 15 wherein said means for providing vertex electrical signals provides coordinate signals representative of coordinate values dimensionally related to said planes definitive of said field of vision and wherein said means for identifying includes means for identifying vertex signals in relation to said planes.

17. A system according to claim 16 wherein said means for identifying vertex signals in relation to said planes includes a plurality of registers for said vertex signals and means for sequentially testing said coordinate signals in relation to each of said planes.

18. A system according to claim 17 wherein said means for sequentially testing includes an arithmetic unit and means for time sharing said unit in relation to said plurality of registers.

19. A system according to claim 17 wherein said means for sequentially testing includes a plurality of individual processing units.

* * * * *